United States Patent [19]

Yamaguchi et al.

[11] Patent Number: 4,556,029
[45] Date of Patent: Dec. 3, 1985

[54] BACK-UP SYSTEM AND METHOD FOR ENGINE COOLANT TEMPERATURE SENSOR IN ELECTRONIC ENGINE CONTROL SYSTEM

[75] Inventors: Hiroshi Yamaguchi; Kunifumi Sawamoto, both of Yokosuka; Hiroshi Sanbuichi; Tatsuo Morita, both of Yokohama; Satoshi Takizawa, Yokosuka, all of Japan

[73] Assignee: Nissan Motor Company, Limited, Yokohama, Japan

[21] Appl. No.: 479,482

[22] Filed: Mar. 28, 1983

[30] Foreign Application Priority Data

Apr. 2, 1982 [JP] Japan ................................. 57-53679

[51] Int. Cl.$^4$ ...................... F01P 11/16; F02D 5/00
[52] U.S. Cl. .............................. 123/41.15; 123/479; 123/491; 123/179 L
[58] Field of Search ................. 123/41.15, 179 L, 479, 123/491

[56] References Cited

U.S. PATENT DOCUMENTS

| | | | |
|---|---|---|---|
| 3,628,510 | 12/1971 | Moulds et al. ................. | 123/179 L |
| 3,792,692 | 2/1974 | Luchaco ........................ | 123/32 |
| 3,834,361 | 9/1974 | Keely ............................ | 123/479 |
| 4,148,282 | 4/1979 | Grassle et al. ................. | 123/179 L |
| 4,246,566 | 1/1981 | Endo ............................. | 340/52 |
| 4,274,381 | 6/1981 | Abo ............................... | 123/491 |
| 4,319,327 | 3/1982 | Higashiyama et al. .......... | 123/492 |
| 4,325,251 | 4/1982 | Kanagae ........................ | 73/119 |
| 4,459,670 | 7/1984 | Yamaguchi et al. ............ | 364/431.10 |

FOREIGN PATENT DOCUMENTS

| | | |
|---|---|---|
| 2237481 | 3/1973 | Fed. Rep. of Germany . |
| 2949192 | 6/1980 | Fed. Rep. of Germany . |
| 3024266 | 1/1981 | Fed. Rep. of Germany . |
| 3206028 | 4/1982 | Fed. Rep. of Germany . |
| 55-78131 | 6/1980 | Japan . |
| 57-335 | 1/1982 | Japan ............................... 123/491 |
| 57-137632 | 8/1982 | Japan . |
| 58-62342 | 4/1983 | Japan . |

OTHER PUBLICATIONS

Patent Abstracts of Japan, vol. 7, No. 153, (Jul. 5, 1983).

*Primary Examiner*—William A. Cuchlinski, Jr.
*Attorney, Agent, or Firm*—Schwartz, Jeffery, Schwaab, Mack, Blumenthal & Evans

[57] ABSTRACT

A back-up system for an engine coolant temperature sensor detects deviation of the output of the temperature sensor from its designed output range to produce a fault signal. In response to the fault signal, an engine control system derives the engine coolant temperature indirectly from other engine conditions. This derivation is based on two facts: (1) the amount of fuel required to start the engine is related to engine temperature, and (2) since the calorific value of a given engine is essentially constant, the rate of increase of engine temperature is related to the integrated number of engine revolutions. Thus, when the engine is to be started, engine temperature can be derived by gradually increasing the fuel supply quantity from a minimal initial value until the engine is able to start to determine the required fuel supply quantity. Thereafter, the derived temperature value can be updated as a function of total engine revolutions.

28 Claims, 8 Drawing Figures

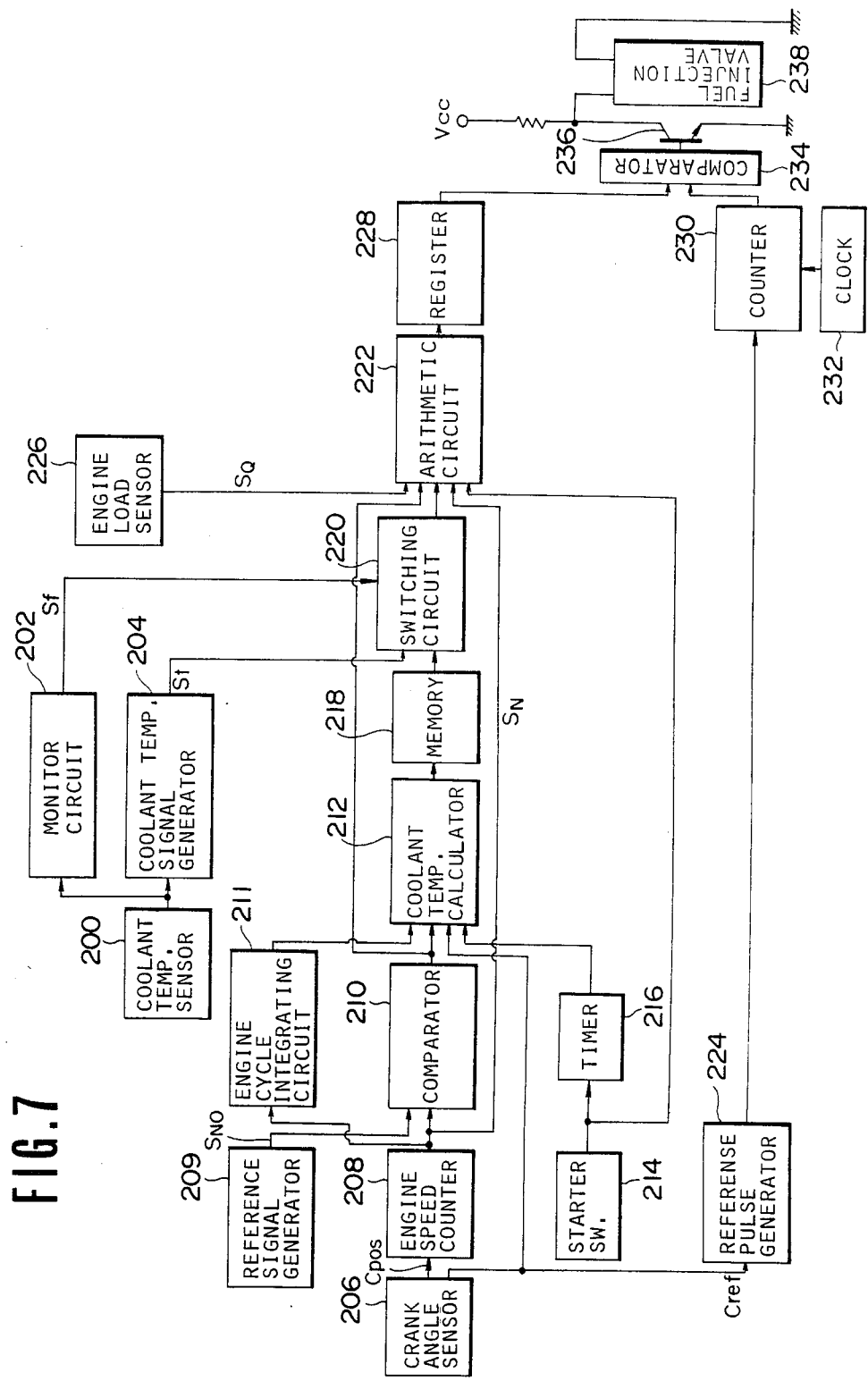

BACK-UP SYSTEM AND METHOD FOR ENGINE COOLANT TEMPERATURE SENSOR IN ELECTRONIC ENGINE CONTROL SYSTEM

BACKGROUND OF THE INVENTION

The present invention relates generally to a fail-safe system in an electronic engine control system, which allows the engine to continue running even after one of the components of the electronic engine control system fails. More particularly, the invention relates to a back-up system for an engine coolant temperature sensor, which is adapted to produce a substitute signal approximately representative of the engine coolant temperature when failure of the engine coolant temperature sensor is detected.

As is well known, an engine coolant temperature is an important and fundamental control parameter in the electronic engine control processes, such as fuel injection control, idling speed control, fast idle control and so forth. Generally, the engine coolant temperature is detected by an engine coolant temperature sensor which produces a signal having a value corresponding to the engine coolant temperature. The engine coolant temperature sensor is installed in a water jacket surrounding the engine cylinders. For example, when a thermistor-type engine coolant temperature sensor is used, the output voltage of the sensor at −40° C. is about 4V and at 120° C. is 1V. In electronic engine control systems, the engine coolant temperature sensor output is fed to a microcomputer via an analog-to-digital converter (hereafter referred to as A/D converter).

If the engine coolant temperature sensor fails or the wiring connecting the sensor to the microcomputer breaks, the values received by the microcomputer from the engine coolant temperature sensor will fall into an abnormal range. If left uncorrected, this would result in failure of the engine control system. Conventionally, the engine control system is provided with a fail-safe or back-up system in order to continue control system operation even when the engine coolant temperature sensor fails. In the conventional system, the engine control system is responsive to the abnormal values of the engine coolant temperature signal to set the engine coolant temperature parameter to a predetermined value which corresponds to a normal range of engine coolant temperature, e.g. 80° C. While this back-up system can keep the engine control system operative, the control by the engine control system may not accurately correspond to engine operating conditions. In particular, under relatively cold engine conditions, such a back-up system can degrade engine start-up characteristics and drivability.

SUMMARY OF THE INVENTION

Therefore, it is an object of the present invention to provide a back-up system for an engine coolant temperature sensor which is able to more accurately approximate the engine coolant temperature on the basis of at least one other engine operating parameter so that an assumed substitute value varies in accordance with variations in engine operating conditions.

Another object of the present invention is to ensure smooth engine start-up even after failure of the engine temperature sensor while simultaneously measuring engine temperature indirectly.

The system of the invention is incorporated in connection with and in addition to the fuel control system of the engine. The method of the invention is employed as an alternative to normal start-up fuel control and in addition to normal operating fuel control when engine temperature sensor operation is unreliable.

The system of the invention comprises a fuel injection valve, an engine coolant temperature sensor, an engine speed sensor, monitoring means for detecting failure of the engine temperature sensor to produce a fault signal, a starter switch and arithmetic means which in the presence of the fault signal produces a fuel injection pulse to be outputted to the fuel injection valve and which, after the starter switch is closed, has a pulsewidth which increases monotonically in a known relationship with time until the engine has been started, starting from an initial pulsewidth which corresponds to the fuel quantity required to start the engine when the engine coolant is at a known temperature, the arithmetic means also measuring the period of time required to start the engine, deriving an initial substitute engine temperature value on the basis of the measured period of time and increasing the substitute engine temperature value in accordance with the integrated number of engine revolution cycles.

If the method of the invention, in response to the starter switch, a fuel injection pulsewidth is assigned an initial value which represents the minimal amount of fuel required to start a hot engine and then while the starter motor cranks the engine, the fuel injection pulsewidth is increased monotonically until the engine starts. An initial value for the engine temperature can then be derived from the period of time required to start the engine. Thereafter, the engine temperature value is adjusted in accordance with the integrated number of engine revolutions until the temperature value reaches a preset upper limit.

The invention is based on the fact that the amount of fuel required to start the engine varies with engine temperature. Thus, engine temperature can be tested at engine start-up by gradually increasing the fuel injection quantity until the engine starts. Furthermore, since the calorific value of a given engine tends to be constant, the heat output, and thus the rate of change of temperature, of the engine can be derived simply from the integral over time of the engine speed, i.e. the total number of engine revolutions since the determination of the initial engine temperature value.

BRIEF DESCRIPTION OF THE DRAWINGS

The present invention will be understood more fully from the detailed description given herebelow and from the accompanying drawings of the preferred embodiments of the invention, which, however, should not be taken as limitative to the invention but for elucidation and explanation only.

In the drawings:

FIG. 7 is a block diagram of a fuel injection control system incorporating the second embodiment of the engine coolant temperature sensor back-up system according to the present invention.

DESCRIPTION OF THE PREFERRED EMBODIMENT

Figure 1:
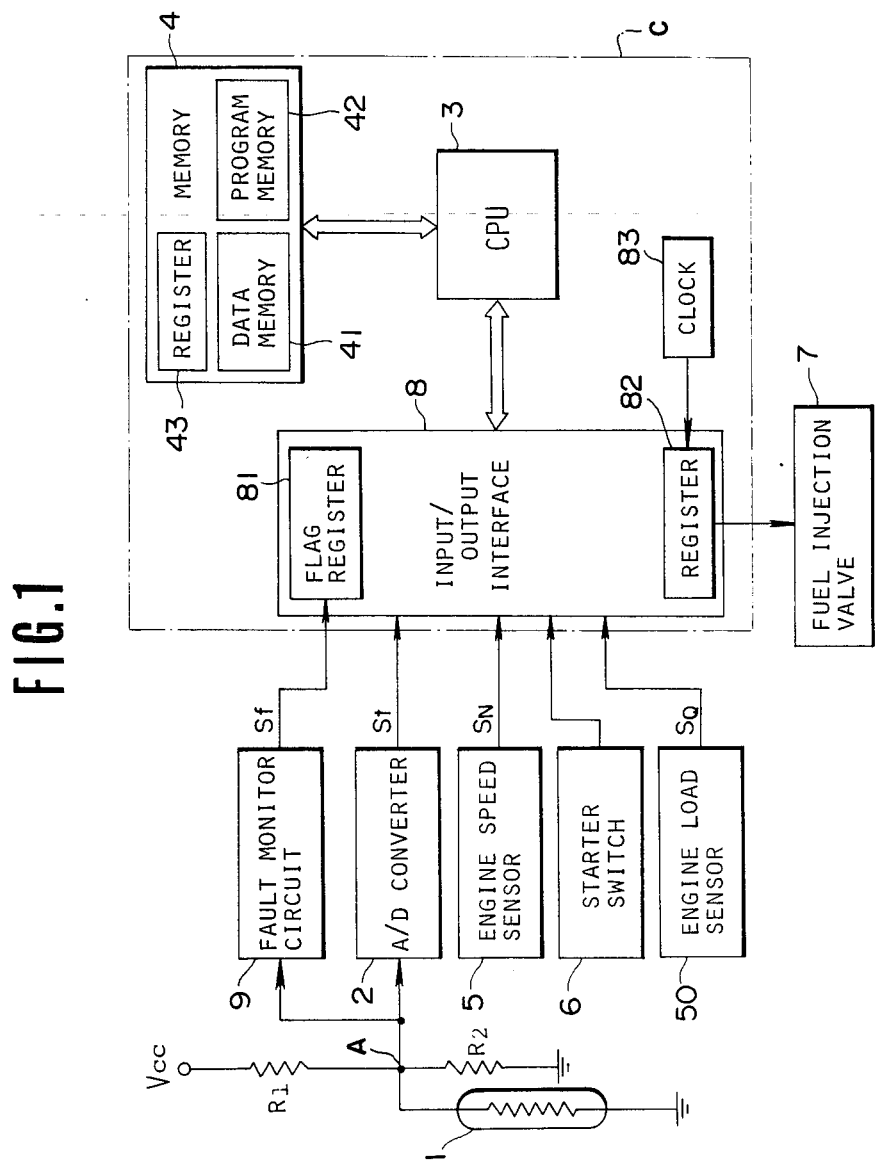
FIG. 1 is a block diagram of a fuel injection control system incorporating the first embodiment of an engine coolant temperature sensor back-up system according to the present invention.

Referring now to the drawings, particularly to FIG. 1, there is illustrated the preferred embodiment of an engine coolant temperature sensor back-up system according to the present invention, which back-up system is associated with a control unit C which consists predominantly of a microcomputer. A thermistor-type engine coolant temperature sensor 1 is installed in an engine coolant passage (not shown) in the engine cylinder block. The engine coolant temperature sensor 1 is connected for output to an analog-to-digital converter 2 via dividing resistors $R_1$ and $R_2$ and is adapted to adjust the voltage at the junction A thereof in accordance with the engine coolant temperature. The analog-to-digital converter 2 produces a digital signal $S_t$ indicative of of the engine coolant temperature and feeds the engine coolant temperature indicative digital signal $S_t$ to an interface 8 in the control unit C.

The voltage at the junction A is also applied to an engine coolant temperature sensor fault monitor circuit 9. The monitor circuit 9 monitors the temperature sensor output voltage and responds to an abnormal range of sensor voltage to produce a HIGH-level fault indicative signal $S_f$ and, otherwise, holds the fault indicative signal $S_f$ at LOW-level. In practice, the monitor circuit 9 causes the fault signal level to go HIGH when the sensor voltage is not within a predetermined range, e.g. 0.5 V to 4.5 V. The monitor circuit 9 is connected for output to a flag register 81 of the interface 8 of the control unit C.

The control unit C generally comprises a CPU 3, a memory unit 4 and the interface 8. As is well known, the interface 8 feeds input data to the CPU 3 via a data bus and outputs output data or output signals to perform engine control operations. In the shown embodiment, the control unit C is adapted to control fuel injection amount by controlling the operation of a fuel injection valve 7. The control unit C is also connected to an engine speed sensor 5 which produces an engine speed signal $S_N$ indicative of the engine revolution speed, a starter switch 6 which is turned on while the engine is cranking during start up, and an engine load sensor 50 for producing an engine load signal $S_Q$ indicative of the load condition on the engine.

In the fuel injection control operation, the control unit C determines a basic fuel injection amount $T_p$ on the basis of the value of the engine speed signal $S_N$ and the value of the engine load signal $S_Q$ and corrects the fuel injection amount by a correction coefficient determined on the basis of the value of the engine coolant temperature indicative signal $S_t$.

The fuel injection amount $T_i$ corrected by the engine coolant temperature dependent correction coefficient may be further corrected on the basis of various fuel injection control parameters, such as acceleration enrichment, fuel-cut, transient correction and so forth, according to well known procedures. For example, U.S. Pat. No. 4,319,327 to Kazuhiro Higashiyama et al discloses a Load Dependent Fuel Injection Control System for determining the basic fuel injection amount on the basis of the engine speed and engine load parameters and correcting the basic fuel injection amount by a correction coefficient determined on the basis of the engine speed and the engine load and an engine temperature dependent correction coefficient. The disclosure of U.S. Pat. No. 4,319,327 is herewith incorporated by reference for disclosure purposes.

Figure 2:
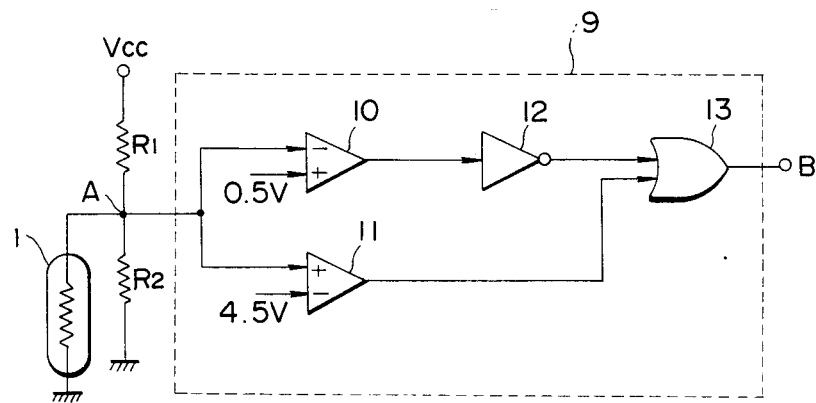
FIG. 2 is a circuit diagram of an engine coolant temperature sensor monitor circuit of FIG. 1.

As shown in FIG. 2, the engine coolant temperature sensor fault monitor circuit 9 comprises a pair of comparators 10 and 11, an inverter 12 and an OR gate 13. As seen from FIG. 2, the engine coolant temperature sensor 1 is connected to the negative input terminal (−) of the comparator 10 and to the positive input terminal (+) of the comparator 11. To the positive input terminal (+) of the comparator 10, a reference voltage generator 10' is connected to feed a reference signal $S_1$ having a voltage representative of a predetermined lower threshold, e.g. 0.5 V. On the other hand, the comparator 11 is connected to a reference voltage generator 11' to receive from the latter a reference signal $S_2$ having a voltage representative of a predetermined upper threshold.

In this construction, as long as the voltage inputted to the comparators 10 and 11 from the engine coolant temperature sensor remains within a normal range defined by the upper and lower threshold, the comparator 10 outputs a HIGH-level comparator signal $S_3$ which is inputted to the OR gate 13 as a LOW-level signal via the inverter 12 and the comparator 11 outputs a LOW-level comparator signal $S_4$ to the OR gate. Therefore, as long as the engine coolant temperature sensor output voltage is in the normal range, the output of the OR gate which serves as the fault indicative signal $S_f$ remains LOW. If the engine coolant temperature sensor fails and thus the engine coolant temperature sensor output drops below the lower threshold, the comparator 10 outputs a LOW-level comparator signal $S_3$ so that a HIGH-level signal is received by the OR gate 13 from the inverter 12. Thus, the signal level of the fault indicative signal $S_f$ goes HIGH. Similarly, when the engine coolant temperature sensor output level exceeds the upper threshold, the signal level of the comparator 11 goes HIGH and so causes the fault indicative signal level to go HIGH.

Preferably, a known delay circuit will be provided in the monitor circuit 9 to provide a fixed delay before outputting the HIGH-level fault indicative signal $S_f$ after the failure of the engine coolant temperature sensor is detected so that the HIGH-level fault indicative signal is outputted only while the output level of the engine coolant temperature sensor remains outside of the normal range for more than a predetermined period of time.

Figure 3:
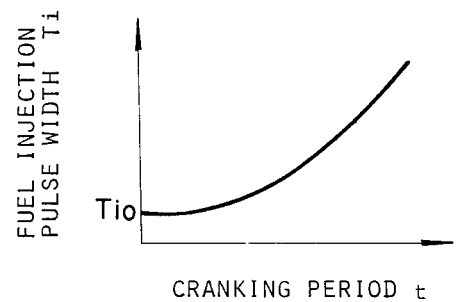
FIG. 3 shows the preferred characteristics of the fuel injection pulsewidth $t_i$ in relation to cranking period t.

Returning to FIG. 1, the memory 3 includes a data memory 41, a program memory 42 and a register 43. The input/output interface 8 includes a register 81 associated with a clock generator 82 which produces a train of constant-period clock pulses $S_c$. The register 81 is also associated with the starter switch 6 to count clock pulses $S_c$ while the starter switch is in the ON position. The register 81 is, therefore, cleared in response to the leading edge of the HIGH-level starter signal $S_s$ and is latched in response to the trailing edge of the HIGH-level starter signal $S_s$. The data memory 41 comprises a random access memory (RAM) for storing temporary values of fuel injection control parameters. In addition, the data memory 41 stores fuel injection pulsewidth data for the engine coolant temperature sensor back-up operation. The fuel injection pulsewidth data may be stored in the data memory in the form of a look-up table reflecting the characteristics shown in FIG. 3. In FIG. 3, the fuel injection pulsewidth $t_i$ (labelled "Ti" in the drawings) during engine cranking is selected to increase with the cranking period t, i.e. with elapsed time during cranking. In the engine coolant temperature sensor back-up operation, the fuel injection pulsewidth $t_i$ is set to a minimum value $t_{i0}$ in response to closing of the starter switch 6. The fuel injection pulsewidth $t_i$ is increased thereafter in relation to the cranking period t as illustrated in FIG. 3. The final fuel injection pulsewidth $t_i$ may be latched either when the starter switch 6 is opened again or when the engine speed N exceeds a predetermined engine speed threshold $N_0$ indicative of self-sustaining engine operation.

Figure 4:
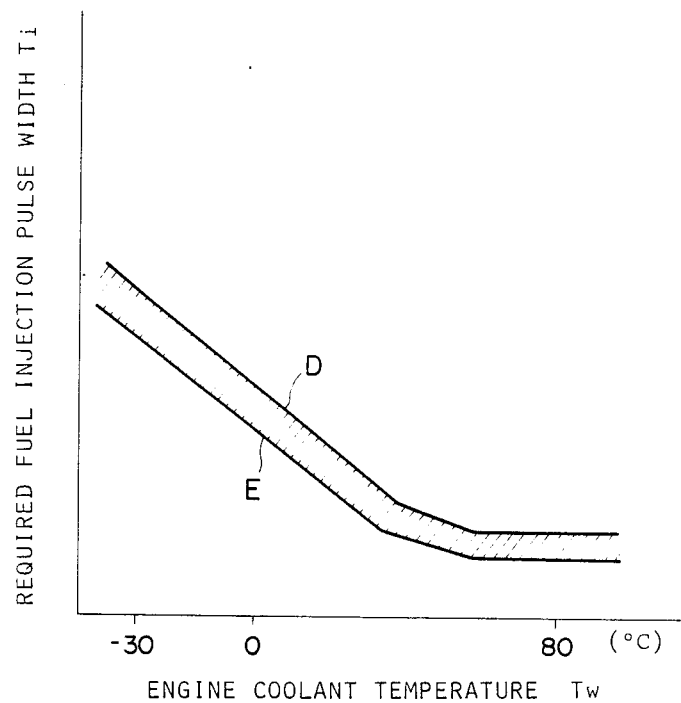
FIG. 4 shows the relationship between the engine coolant temperature $T_w$ and the required fuel injection pulsewidth $t_i$ corresponding to the engine coolant temperature.
Figure 5:
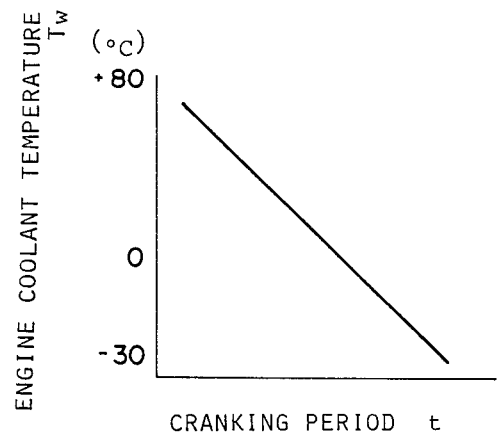
FIG. 5 shows the relationship between the engine coolant temperature $T_w$ and the cranking period t.

The data memory 41 also stores engine coolant temperature data which are read out in terms of the final fuel injection pulsewidth $t_1$. The final fuel injection pulsewidth $t_1$ reflects the engine coolant temperature at the time of cranking as shown in FIG. 4. In FIG. 4, the line D represents an upper limit of the fuel injection pulsewidth $t_i$ for starting the engine corresponding to a given engine coolant temperature and the line E represents a lower limit. Therefore, the fuel injection pulsewidth $t_1$ at the end of engine cranking should be within the hatched range. As apparent from FIG. 4, the final fuel injection pulsewidth $t_1$ decreases as the engine coolant temperature $T_w$ rises and reaches its minimum value at engine coolant temperatures above about 60° C. FIG. 5 shows the characteristics of variation of the cranking period t in relation to the engine coolant temperature. As set forth previously, the final fuel injection pulsewidth $t_1$ is a known function of the cranking period t as illustrated in FIG. 3. Therefore, the engine coolant temperature $T_w$ may be derived or approximated on the basis of the cranking period t according to the characteristics of FIG. 5. The engine coolant temperature data can thus be stored in the data memory 41 in the form of a look-up table accessed in terms of the cranking period.

Figure 6:
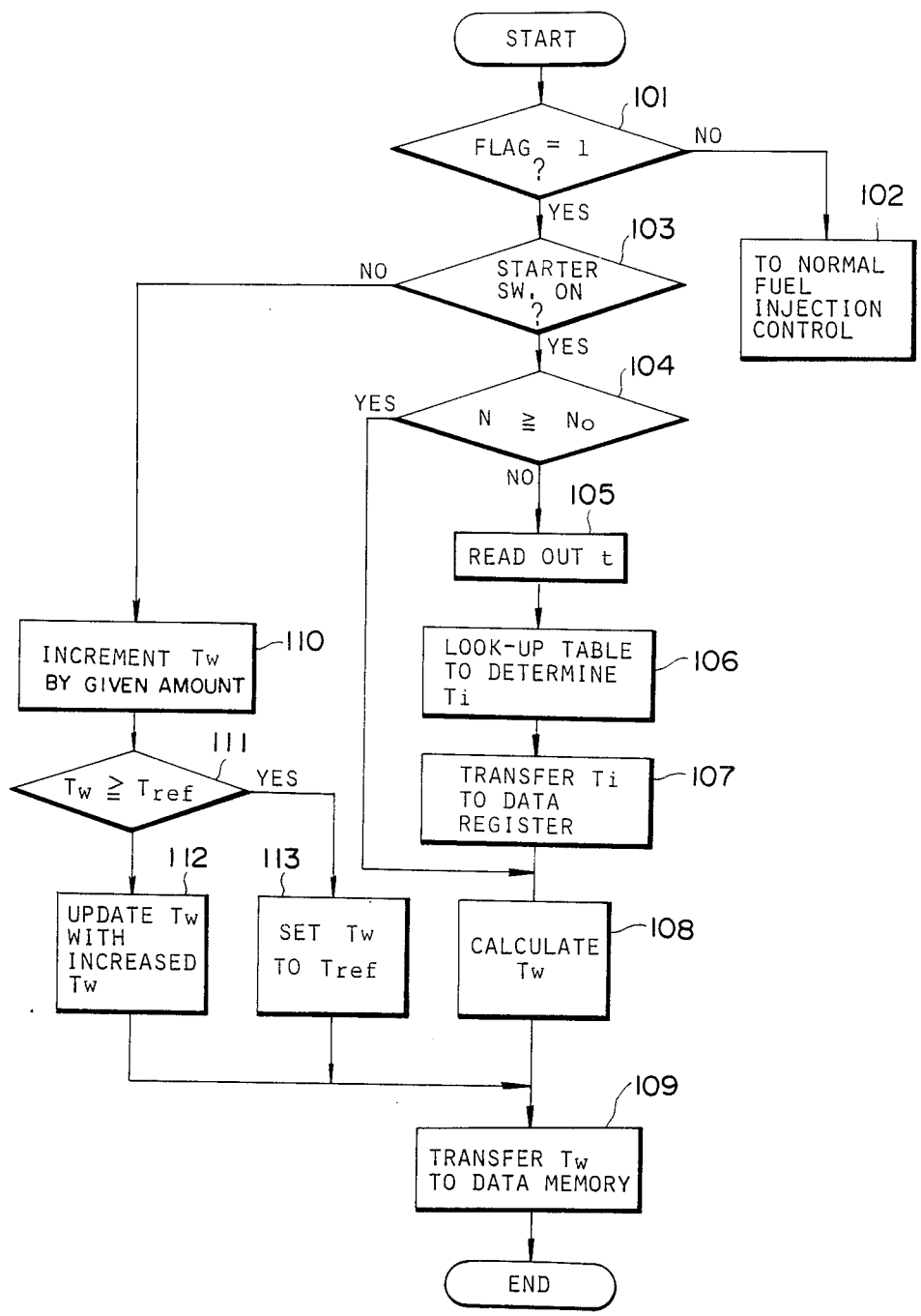
FIG. 6 is a flowchart of the engine coolant temperature sensor back-up operation according to the first embodiment of the invention.

The program memory 42 stores a fuel injection control program and a back-up program to be executed when failure of the engine coolant temperature sensor is detected. The back-up program is shown in FIG. 6 in the form of a flowchart. After starting the fuel injection control program, the flag register 81 is checked in block 101. If the FLAG is "0" and thus the answer at the block 101 is NO, the normal fuel injection control program is executed, as represented by a block 102. On the other hand, if the FLAG is "1" and thus failure of the engine coolant temperature sensor 1 is detected, the starter switch position is checked at a block 103. If the starter switch 6 is in the ON position and thus the engine is cranking, the engine speed N is compared to a predetermined engine speed threshold $N_0$ at a block 104. If the engine speed is lower than the engine speed threshold $N_0$, the count value in the register 82 of the input/output interface 8 is read out. As set forth previously, the register value is representative of elapsed time since the starter switch was turned ON. In other words, at the block 105, the cranking period t is read out. Based on the cranking period t, the data memory 41 holding the fuel injection pulsewidth data $t_i$ is accessed to obtain the fuel injection pulsewidth corresponding to the current cranking period value at a block 106. Thereafter, the fuel injection pulsewidth data $t_i$ is transferred to the register 43 in the memory 4, at a block 107. At a block 108, the data memory 41 holding the engine coolant temperature data is accessed to derive a substitute engine coolant temperature value $T_w$ in terms of the cranking period t. The assumed engine coolant temperature $T_w$ is transferred to the register 43 at a block 109.

If the starter switch 6 is ON when checked at the block 103 and the engine speed N is higher than the engine speed threshold $N_0$ when checked at the block 104, then program execution jumps directly to the block 108. In this case, the final fuel injection pulsewidth $t_1$ is used to derive $T_w$ in step 108.

On the other hand, if the starter switch 6 is OFF and thus the answer at the block 103 is NO, the engine coolant temperatue $T_w$ stored in the register 43 is incremented by a given amount so as to increase at a given rate, at a block 110. The rate of increase of the engine coolant temperature is proportional to the calorific value of the engine provided that the engine coolant temperature $T_w$ is lower than a set temperature of a thermostat provided in the engine coolant circulation system so that engine coolant circulation is not required. The calorific value determines how much heat is generated by the engine in every engine revolution. Therefore, the rate of increase of the assumed engine coolant temperature is determined on the basis of the integrated number of engine revolution cycle. To enable the back-up system to calculate the rate of increase of the engine coolant temperature, the register 82 in the input/output interface 8 is adapted to count engine revolutions. To register value showing the integral number of engine revolution cycles will be cleared when the ignition switch of the engine is turned OFF. Thus, the increment to the engine coolant temperature $T_w$ may be determined on the basis of the integrated number of the engine revolution cycles and on the calorific value of the given engine.

The incremented engine coolant temperature $T_w$ is compared to a predetermined temperature threshold $T_{ref}$, e.g. 80° C., which is the set temperature of a thermostat provided in the engine coolant circulation system, at a block 111. If the incremented engine coolant temperature $T_w$ is less than the temperature threshold $T_{ref}$, the engine coolant temperature data in the register 43 is replaced by the incremented engine coolant temperature, at subsequent blocks 112 and 109. On the other hand, if the incremented engine coolant temperature is equal to or greater than the temperature threshold, the engine coolant temperature data in the register 43 is latched at the temperature corresponding to the temperature threshold, at subsequent blocks 113 and 109. This is because engine coolant circulation triggered by the thermostat will tend to place an upper limit on engine coolant temperature.

After the block 109, the engine coolant temperature sensor back-up program ends and the assumed engine coolant temperature data is used for engine control operations, not only to control the fuel injection amount but also to control engine idling speed, exhaust gas recirculation rate and so forth.

FIG. 7 shows the second embodiment of the engine coolant temperature sensor back-up system as employed in a fuel injection control system. As in the foregoing first embodiment, the engine coolant temperature sensor 200 produces a sensor signal having a voltage indicative of the engine coolant temperature. An engine coolant temperature signal generator 204 receives the sensor signal and produces a engine coolant temperature signal $S_t$. The sensor signal is also applied to the engine coolant temperature sensor monitor circuit 202. The monitor circuit 202 has the same circuitry as in the foregoing first embodiment and is adapted to produce the HIGH-level fault signal $S_f$ when the sensor signal voltage is out of the predetermined normal range.

A crank angle sensor 206 is adapted to produce a crank reference signal $C_{ref}$ at every predetermined crank shaft angular position e.g. 90° or 120°, and a crank position signal $C_{pos}$ at every predetermined angle, e.g. 1° or 2°, of the crank shaft rotation. The crank position signal $C_{pos}$ is fed to an engine speed counter 208 which is adapted to detect the engine speed N on the basis of the crank position signal to produce an engine speed signal $S_N$ having a value indicative of the engine speed. The engine speed counter 208 is connected to a comparator 210 to which a reference signal generator 209 is connected. The reference signal generator 209 produces a reference signal $S_{N0}$ having a value indicative of the predetermined engine speed threshold $N_0$. The comparator 210 compares the engine speed signal value N to the reference signal value $N_0$ to produce a HIGH-level comparator signal when the engine speed signal value is equal to or greater than the reference signal value and otherwise to produce a LOW-level comparator signal.

The comparator 210 is connected to an engine coolant temperature calculator 212 to output the comparator signal thereto. The coolant temperature calculator 212 is also connected to a timer 216 which is, in turn, connected to the starter switch 214. The timer 216 produces a timer signal to measure the cranking period of the engine. For this purpose, the timer 216 is cleared every time the starter switch 216 is turned ON and thus the HIGH-level starter signal rises. The coolant temperature calculator 212 latches the timer signal value when the comparator signal level goes HIGH or when the starter switch is turned off. As set forth previously, the coolant temperature calculator 212 derives an approximated engine coolant temperature value $T_w$ on the basis of the latched cranking period t according to the characteristics shown in FIG. 5. The coolant temperature calculator 212 produces a signal indicative of the assumed engine coolant temperature which is stored in a memory 218.

An arithmetic circuit 222 is connected to receive the output of the memory 218 via a switching circuit 220 which is, in turn, connected to receive the output of the coolant temperature signal generator 204. The switching circuit 220 is also connected to receive the output of the engine coolant temperature sensor monitor circuit 202 which controls which of the memory 218 and temperature signal generator 204 is to be connected for output to the arithmetic circuit 222. The engine load sensor 226, the engine speed counter 208, and the starter switch 214 are also connected to the arithmetic circuit. In the presence of the HIGH-level fault signal $S_f$ from the engine coolant temperature sensor monitor circuit 202, the arithmetic circuit 222 is responsive to actuation of the starter switch 214 to produce a fuel injection pulse having a predetermined initial pulsewidth $t_{i0}$. As long as the starter switch 214 remains in the ON position, the arithmetic circuit 222 increases the fuel injection pulsewidth $t_i$ according to the characteristics illustrated in FIG. 3. The arithmetic circuit 222 is responsive to the opening of the starter switch 214, i.e., the HIGH-level comparator signal from the comparator 210 to latch the fuel injection pulsewidth $t_i$ at that time, i.e. at the end of engine cranking.

After the engine has started, the coolant temperature calculator 212 receives an integrated engine revolution cycle number indicative signal from an engine cycle integrating circuit 211 which is, in turn, connected to the engine speed counter 208 and is adapted to integrate the engine revolution cycle number. Based on the signal value from the engine cycle integrating circuit 211, the coolant temperature calculator 212 increases the assumed engine temperature $T_w$ according to the characteristics of FIG. 5. The value stored in the memory 218 is replaced by the increased assumed engine coolant temperature. As set forth previously in the first embodiment, the assumed engine coolant temperature $T_w$ as stored in the memory 218 may be held constant after the assumed temperature value becomes equal to or greater than the predetermined engine coolant temperature threshold, e.g. 80° C.

The arithmetic circuit 222 determines the fuel injection pulsewidth on the basis of the engine load signal $S_Q$ from the engine load sensor 226, the engine speed signal $S_N$ from the engine speed counter 208 and one of engine coolant temperature-indicative signals from the engine coolant temperature signal generator 204 or the memory 218. The fuel injection control signal having the determined pulsewidth $t_i$ is fed to a register 228 to be temporarily stored. The register 228 feeds a register signal indicative of the stored fuel injection pulsewidth $t_i$ to a comparator 234. The comparator 234 is, in turn, connected to receive the output of a counter 230 adapted to count clock pulses from a clock generator 232. The counter 230 is also connected to a reference pulse generator 224 to receive therefrom a reference pulse for each cycle of engine revolution. The counter 230 is cleared by the reference pulses from the reference pulse generator 224. The comparator 234 compares the register signal value and the counter value and produces a HIGH-level comparator signal when the counter value becomes equal to or greater than the register signal value.

The comparator 234 is connected for output to the base of a transistor 236 and so is able to turn the latter on with the HIGH-level comparator signal. Therefore, the transistor 236 remains OFF, i.e. nonconductive, as long as the comparator signal remains LOW, in other words, as long as the counter value is less than the register value. The fuel injection valve 238 is open to inject the fuel while the transistor 236 remains OFF and is closed when the transistor is turned ON by the HIGH-level comparator signal.

Figure 8:
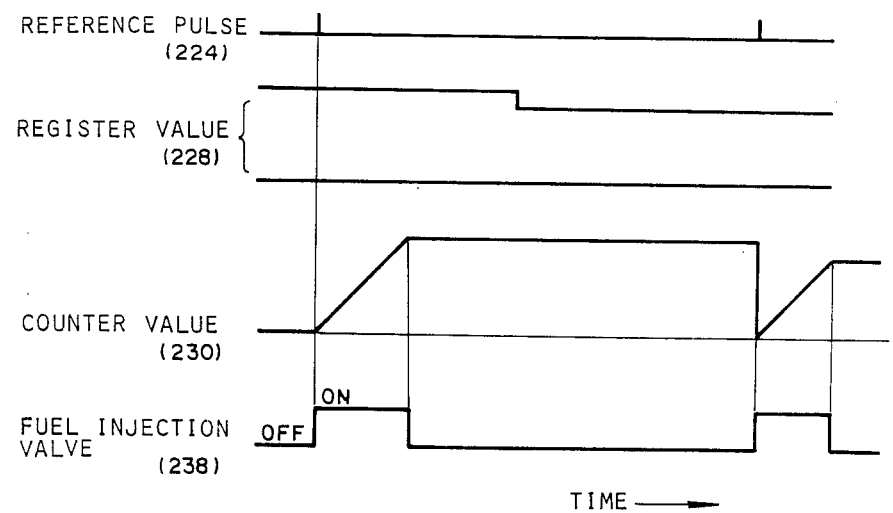
FIG. 8 is a timing diagram showing the relative timing and pulsewidths of various signals.

The relative timing of signals from reference pulse generator 224, register 228, and counter 230, as well as those signals controlling fuel injection valve 238, is shown in FIG. 8.

As set forth previously, the engine coolant temperature sensor back-up system according to the present invention can produce a back-up signal indicative of the assumed engine coolant temperature which varies in accordance with the engine operating conditions. As a result, engine control after failure of the engine coolant temperature sensor can be more precise and engine starting characteristics can be significantly improved, even when the engine is relatively cold.

Therefore, the invention fulfills all of the objects and advantages sought therefor.

Although the invention has been disclosed in relation to fuel injection control, the assumed engine coolant temperature may be used in other engine control processes such as engine idling speed control, exhaust gas recirculation control and so forth. Therefore, the invention should not be limited to the shown fuel injection control but should be considered as applicable to any engine control system.

What is claimed is:

1. A back-up system for an engine coolant temperature sensor in an engine control system, comprising:
   a fuel injection valve;
   an engine coolant temperature sensor for detecting an engine coolant temperature and producing an engine coolant temperature signal indicative of the engine coolant temperature;
   an engine speed sensor for detecting an engine revolution speed and producing an engine speed signal indicative of the engine speed;
   monitoring means for detecting failure of the engine coolant temperature sensor to produce a fault signal;
   a starter switch for producing a starter signal while it is turned ON for starting up the engine;
   arithmetic means, responsive to turning ON of said starter switch, for producing a fuel injection pulse to be fed to said fuel injection valve having a pulsewidth gradually increased from a predetermined initial pulsewidth, for measuring a period of time in which said starter switch is maintained at ON position to assume the engine coolant temperature on the basis of the measured period of time, for determining a calorific value produced by the engine revolution on the basis of the engine speed signal to determine an increasing value of the engine coolant temperature after the engine starting up, said arithmetic means producing an assumed engine coolant temperature signal indicative of the assumed engine coolant temperature.

2. The back-up system as set forth in claim 1, which further comprises detector means for detecting the engine speed signal value equal to or higher than a predetermined engine speed threshold to produce an engine driving indicative signal, and wherein said arithmetic means is responsive to the engine driving indicative signal to determine the engine coolant temperature on the basis of the period of time from when said starter switch is turned ON to when said engine driving indicative signal is produced.

3. The back-up system as set forth in claim 2, wherein said arithmetic means determines said calorific value by integrating the number of engine cycles on the basis of said engine speed sensor.

4. The back-up system as set forth in claim 2, wherein said arithmetic means compares said assumed engine coolant temperature with a predetermined engine coolant temperature threshold to keep the assumed engine coolant temperature constant when said assumed engine coolant temperature becomes equal to or higher than said engine coolant temperature threshold.

5. The back-up system as set forth in claim 4, wherein said monitoring means comprises a comparator adapted to compare the engine coolant temperature signal value with an upper first and a lower second threshold, said comparator producing said fault signal when said engine coolant temperature signal value is more than said first threshold or is less than said second threshold.

6. The back-up system for an engine coolant temperature sensor in an engine control system, comprising:
   a fuel injection valve adapted to open in a period corresponding to a fuel injection pulsewidth;
   an engine coolant temperature sensor adapted to produce an engine coolant temperature signal having a voltage corresponding to the engine coolant temperature;
   an engine revolution sensor for detecting the engine revolution to produce an engine revolution indicative signal;
   a starter switch adapted to produce a starter ON signal while said starter switch is turned ON;
   an engine speed detector adapted to detect the engine speed on the basis of said engine revolution indicative signal to produce an engine speed detector signal when the detected engine speed becomes equal to or higher than a predetermined engine speed threshold;
   an engine cranking period detector associated with said starter switch and said engine speed detector for measuring a period from the turning ON of said starter switch until the first of the turning OFF of said starter switch and the occurrence of said engine speed detector signal;
   a fault monitor associated with said engine coolant temperature sensor for detecting a condition in which the engine coolant temperature signal voltage is outside of a predetermined range and for producing a fault signal upon detecting said condition; and
   arithmetic means, responsive to said fault signal, for performing a back-up operation to assume the engine coolant temperature on the basis of the engine operating condition, and for producing a fuel injection control signal to control said fuel injection valve, said arithmetic means determining a fuel injection pulsewidth which is increased at a given rate corresponding to the cranking period from a predetermined initial pulsewidth, assuming the engine coolant temperature on the basis of the detected cranking period, calculating a calorific value created by subsequent engine revolution on the basis of said engine revolution indicative signal to increase said assumed temperature in accordance with the calculated calorific value and continuing to produce said fuel injection control signal in accordance with said assumed engine coolant temperature.

7. The back-up system as set forth in claim 6, wherein said arithmetic means latches said assumed engine coolant temperature at a constant value when said assumed engine coolant temperature reaches a predetermined engine coolant temperature threshold.

8. The back-up system as set forth in claim 7, wherein said engine coolant temperature threshold is set at a temperature which corresponds to a set temperature of a thermostat in an engine cooling system.

9. The back-up system as set forth in claim 7, wherein said arithmetic means incorporates a memory storing said fuel injection pulsewidth gradually increased during the engine cranking, the rate of increase of said fuel injection pulsewidth having characteristics determined on the basis of the required fuel injection amount corresponding to the engine coolant temperature for starting up the engine.

10. The back-up system as set forth in claim 9, wherein said arithmetic means further includes a memory storing the engine coolant temperature data to be read out in terms of the detected engine cranking period.

11. The back-up system as set forth in claim 10, wherein said arithmetic means integrates the number of said engine revolution indicative signals to determine said created calorific value in the engine revolution.

12. A back-up system for an engine coolant temperature sensor in an engine control system, comprising:
 a fuel injection valve for injecting fuel into the engine while a fuel injection pulse is present;
 an engine coolant temperature sensor for detecting an engine coolant temperature and producing an engine coolant temperature signal indicative of the engine coolant temperature;
 an engine speed sensor for measuring engine revolution speed and producing an engine speed signal indicative of the engine speed;
 monitoring means for detecting failure of the engine coolant temperature sensor, and for producing a fault signal;
 a starter switch for producing a starter signal while it is turned ON to start the engine;
 arithmetic means responsive to said starter signal for producing a fuel injection pulse to be fed to said fuel injection valve having a pulsewidth which gradually increases with a known, monotonic behavior from a predetermined initial pulsewidth which corresponds to the fuel injection quantity required to start the engine when the engine coolant is at a first, relatively high temperature, for measuring the period of time during which said starter signal is produced, for deriving a substitute engine coolant temperature value on the basis of the measured period of time, for determining the rate of increase of the substitute engine coolant temperature value in accordance with a calorific value of the engine and the engine speed signal, said arithmetic means producing an assumed engine coolant temperature signal indicative of the substitute engine coolant temperature value in the presence of the fault signal.

13. The back-up system as set forth in claim 12, which further comprises detector means for detecting when the engine speed signal value equal to or greater than a predetermined engine speed threshold and for producing an engine-running indicative signal at such times, and in which said arithmetic means is responsive to the engine-running indicative signal to derive the substitute engine coolant temperature from the period of time between the first occurrence of said starter signal and said engine-running indicative signal.

14. The back-up system as set forth in claim 13, wherein said arithmetic means determines said rate of increase by integrating the number of engine revolution cycles after production of said engine-running indicative signal on the basis of said engine speed sensor.

15. The back-up system as set forth in claim 13, wherein said arithmetic means compares said assumed engine coolant temperature with a predetermined engine coolant temperature threshold and holds the assumed engine coolant temperature constant when said assumed engine coolant temperature becomes equal to or greater than said engine coolant temperature threshold.

16. The back-up system as set forth in claim 15, wherein said monitoring means comprises a comparator adapted to compare the engine coolant temperature signal value with an upper first and a lower second threshold value, said comparator producing said fault signal when said engine coolant temperature signal value is greater than said first threshold or less than said second threshold.

17. The back-up system for an engine coolant temperature sensor in an engine control system, comprising:
 a fuel injection valve adapted to open to inject fuel into an engine during a period corresponding to a fuel injection pulsewidth;
 an engine coolant temperature sensor adapted to produce an engine coolant temperature signal having a voltage corresponding to the engine coolant temperature;
 an engine revolution sensor for detecting engine rotation and producing an engine revolution indicative signal;
 a starter switch adapted to produce a starter ON signal while it is turned ON;
 engine speed detector for calculating the engine speed on the basis of said engine revolution indicative signal and producing an engine speed detector signal when the calculated engine speed becomes equal to or greater than a predetermined engine speed threshold;
 a engine cranking period detector associated with said starter switch and said engine speed detector for measuring the cranking period of time between the turning ON of said starter switch and the first one of the turning OFF of said starter switch and the occurrence of said engine speed detector signal; and
 a fault monitor associated with said engine coolant temperature sensor for detecting when the engine coolant temperature signal voltage is outside of a predetermined range to produce a fault signal; and
 arithmetic means responsive to said fault signal for outputting a fuel injection pulsewidth which is increased from a predetermined initial pulsewidth at a given variable rate during said measured period of time, for deriving a substitute coolant temperature on the basis of said measured period, calculating the integral of the engine revolution cycles on the basis of said engine revolution indicative signal, increasing said substitute temperature in accordance with the integrated engine cycle value, and adjusting said fuel injection pulsewidth depending on said substitute engine coolant temperature.

18. The back-up system as set forth in claim 17, wherein said arithmetic means holds said substitute engine coolant temperature to a constant value when said substitute engine coolant temperature reaches a predetermined engine coolant temperature threshold.

19. The back-up system as set forth in claim 18, wherein said engine coolant temperature threshold is chosen to be the temperature to which a thermostat in an engine cooling system is set.

20. The back-up system as set forth in claim 18, wherein said arithmetic means incorporates a memory storing a table of said fuel injection pulsewidth values arrayed in terms of said cranking period so as to increase monotonically with cranking period, said arithmetic means calculating said fuel injection pulsewidth during engine cranking by reading the stored pulsewidth associated with the currently measured cranking period value.

21. The back-up system as set forth in claim 20, wherein said arithmetic means further includes a memory storing substitute engine coolant temperature data arrayed in terms of final measured cranking period.

22. A method of deriving the temperature of an internal combustion engine, comprising the steps of:
(a) controlling the amount of fuel per engine revolution supplied to the engine to an initial value in response to the closing of a starter switch;
(b) increasing the amount of fuel as a known function of time until the engine starts;
(c) measuring the length of time required to start the engine; and
(d) calculating the engine temperature from the measured length of time with reference to a known relationship between engine starting time and engine temperature.

23. The method of claim 22, wherein said initial fuel supply value is the amount of fuel required to start the engine when the engine is at a known, relatively high temperature.

24. A method for backing up an engine coolant temperature sensor in an engine control system, comprising the steps of:
(a) producing a fault signal upon detecting failure of the engine coolant temperature sensor;
(b) in the presence of the fault signal, setting the amount of fuel to be supplied to the engine per engine revolution to a minimal, initial value in response to activation of a starter motor;
(c) increasing the fuel supply amount as a known function of time until the engine starts;
(d) measuring the time required for the engine to start after activation of the starter motor in order to derive the fuel supply amount required to start the engine;
(e) deriving the engine coolant temperature at the time the engine starts from the derived fuel amount with reference to a known relationship between engine coolant temperature and fuel amount required to start the engine;
(f) counting engine revolutions after the engine has started to derive the integral of engine revolution;
(g) increasing the derived engine coolant temperature value in accordance with the engine revolution count; and
(h) in the presence of the fault signal, adjusting the fuel supply amount in accordance with the derived engine coolant temperature.

25. The method of claim 24 wherein the output of the engine coolant temperature sensor is designed to fall within a known voltage range and said detecting failure of the engine coolant temperature sensor comprises the steps of comparing the output of said sensor with upper and lower values corresponding to the upper and lower limits of said voltage range, respectively, and outputting the fault signal when said output exceeds the upper value or falls below the lower value.

26. A method of deriving the temperature of an internal combustion engine comprising the steps of:
effecting fuel injection while the engine is being cranked by a starter to inject a measured amount of fuel into a combustion chamber of said engine, said measured amount of fuel being increased at a given rate and at a given time;
detecting the time required to start said engine and further detecting a final measured amount of fuel injected when the engine starts;
determining the minimum amount of fuel per engine revolution required to start the engine on the basis of the detected amount of time required to start the engine and the final measured amount of fuel; and
calculating the engine temperature from the determined required fuel amount with reference to a known relationship between known fuel amount and engine temperature.

27. The method of claim 26, further comprising the steps of:
(a) counting engine revolution cycles after the engine has been started; and
(b) increasing the calculated engine temperature value in accordance with the engine cycle count.

28. The method of claim 27 further comprising the step of halting the increase of the calculated engine temperature value when the engine temperature value reaches a predetermined upper limit.

* * * * *